United States Patent
de Bock et al.

(10) Patent No.: US 11,858,613 B2
(45) Date of Patent: Jan. 2, 2024

(54) AEROSPACE VEHICLES WITH COATINGS FOR HEAT RADIATION AND ASSOCIATED METHODS

(71) Applicant: General Electric Company, Schenectady, NY (US)

(72) Inventors: Hendrik Pieter Jacobus de Bock, Clifton Park, NY (US); William Dwight Gerstler, Niskayuna, NY (US); Anant Achyut Setlur, Niskayuna, NY (US); James William Bray, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/100,996

(22) Filed: Nov. 23, 2020

(65) Prior Publication Data
US 2022/0161919 A1   May 26, 2022

(51) Int. Cl.
*B64C 1/38*   (2006.01)
*B64C 30/00*   (2006.01)

(52) U.S. Cl.
CPC ............. *B64C 1/38* (2013.01); *B64C 30/00* (2013.01)

(58) Field of Classification Search
CPC .......... B64C 30/00; B64G 1/226; B64G 1/62; B64G 1/38
See application file for complete search history.

(56) References Cited

U.S. PATENT DOCUMENTS

| | | | | |
|---|---|---|---|---|
| 3,182,469 A | * | 5/1965 | Kirchner | F02K 9/972 244/159.1 |
| 6,676,077 B1 | * | 1/2004 | DiChiara, Jr. | B64C 5/00 244/133 |
| 8,197,722 B2 | * | 6/2012 | Marder | G11B 7/25 252/582 |
| 10,273,024 B1 | * | 4/2019 | Youngquist | B64G 1/503 |
| 2004/0258900 A1 | * | 12/2004 | Simon | C04B 35/6263 428/421 |
| 2017/0129592 A1 | * | 5/2017 | Clemen, Jr. | B64C 21/00 |

FOREIGN PATENT DOCUMENTS

| | | | | |
|---|---|---|---|---|
| EP | 0501861 A1 | * | 9/1992 | ............ F02K 9/40 |
| EP | 1170208 A2 | * | 1/2002 | ............ B64G 1/503 |
| EP | 3724482 B1 | * | 8/2021 | ............ F02K 9/40 |

OTHER PUBLICATIONS

"Orbiter Thermal Protection System," Feb. 1989, NASA (Year: 1989).*

(Continued)

*Primary Examiner* — Joshua J Michener
*Assistant Examiner* — Ryan Andrew Yankey
(74) *Attorney, Agent, or Firm* — Dority & Manning, P.A.

(57) ABSTRACT

An aerospace vehicle including: a body, wherein the body is configured to generate heat during operation; a coating disposed over at least a portion of the body, the coating being configured to shift a frequency of at least one wavelength of the heat generated by the body from a first frequency to a second frequency having higher transmissivity relative to a neighboring medium surrounding the body as compared to the first frequency.

18 Claims, 3 Drawing Sheets

(56) References Cited

OTHER PUBLICATIONS

James B. Kouroupis, "Flight Capabilities of High-Speed-Missile Radome Materials," 1992, John Hopkins, APL Technical Digest, vol. 13, (Year: 1992).*
"Space Shuttle Main Engine Orientation," Jun. 1998, Boeing (Year: 1998).*
T Badinand and T H Fransson, "Radiative Heat Transfer in Film Cooled Liquid Rocket Engine Nozzles," Mar. 2003, Royal Institude of Technology, Journal of Thermophysics and Heat Transfer, vol. 17. (Year: 2003).*
"Speed Regimes Hypersonic Re-Entry," Aug. 24, 2006, NASA (Year: 2006).*
"Space Shuttle Orbiter Diagram", Oct. 9, 2006, NASA (Year: 2006).*
"Spacecraft Reentry Communications Blackout," Sep. 14, 2009, Australian Space Academy (Year: 2009).*
Brian Dundar, "Space Shuttle Main Engines," Jul. 16, 2009, NASA (Year: 2009).*
YouTube video titled: "Space Shuttle Reentry In-depth," by user Simiply Space, posted Jul. 26, 2020, URL: https://youtu.be/IA91evJ-wdk?t=290 (Year: 2020).*
Benningfield, "Shuttle Tiles", Smithsonian Magazine, May 2006, Retrieved from: https://www.smithsonianmag.com/air-space-magazine/shuttle-tiles-12580671/.
Raman et al., Passive Radiative Cooling Below Ambient Air Temperature Under Direct Sunlight, Nature, vol. 515, Nov. 27, 2014, 11 Pages. https://web.stanford.edu/group/fan/publication/Raman_Nature_515_540_2014.
Wikipedia, Photon Upconversion, 6 Pages. Retrieved on Aug. 6, 2020 from Webpage: https://en.wikipedia.org/wiki/Photon_upconversion#: ~:text=Photon%20upconversion%20(UC)%20is%20a.infrared%20light%20to%20visible%20light.
Weingarten et al., Experimental Demonstration of Photon Upconversion via Cooperative Energy Pooling, Nature Communications, published Mar. 15, 2017, 7 Pages. http://www.nature.com/articles/ocomms14808.

* cited by examiner

AEROSPACE VEHICLES WITH COATINGS FOR HEAT RADIATION AND ASSOCIATED METHODS

FIELD

The present subject matter relates generally to aerospace vehicles, and more particularly to vehicles having coatings for improved heat radiation.

BACKGROUND

As high speed aerospace vehicles move through the air, the air surrounding the vehicle gets hot due to friction with the vehicle.

As the vehicle travels faster, temperatures increase in and around the vehicle which can result in the formation of a plasma layer surrounding the vehicle body. The existence of the hot layer surrounding the vehicle can reduce the ability to reject from the vehicle body which degrades performance and capability of the vehicle, which can house an engine and on-board systems which need to reject heat to operate.

The layer surrounding the vehicle at high speeds can contain air, plasma or disassociated species of components of air such as Oxygen, Nitrogen, or combinations of the molecules thereof.

These layers can inhibit heat transport from the vehicle by being fully or partially opaque to radiative heat transfer in select frequency bandwidths, which means they will absorb radiation coming from the vehicle, heat up and radiate it back to the vehicle, limiting heat rejection effectively trapping heat there.

BRIEF DESCRIPTION

Aspects and advantages of the invention will be set forth in part in the following description, or may be obvious from the description, or may be learned through practice of the invention.

In one exemplary aspect of the present disclosure, an aerospace vehicle comprising a body configured to generate heat during operation; and a coating disposed over at least a portion of the body, the coating being configured to shift a frequency of at least one wavelength of the heat generated by the body from a first frequency to a second frequency having higher transmissivity relative to a neighboring medium surrounding the body as compared to the first frequency.

In another exemplary aspect of the present disclosure, A supersonic vehicle comprising: a vehicle body; an engine that generates heat during operation; and a coating disposed on at least a portion of the engine, the vehicle body, or both, the coating being configured to shift a wavelength of the heat to a frequency equal to or above a plasma frequency ($\omega_p$) of a neighboring medium surrounding the engine during supersonic operation.

In another exemplary aspect of the present disclosure, A method of dissipating heat from a hypersonic vehicle, the method comprising: applying a coating to at least a portion of an engine of the hypersonic vehicle, a vehicle body of the hypersonic vehicle, or both, the coating being configured to shift a wavelength of heat emitted by the engine to a frequency equal to or above an expected plasma frequency ($\omega_{pe}$) of a neighboring medium surrounding the vehicle during hypersonic operation.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a high speed aerospace vehicle, forward refers to a position closer to the leading edge and aft refers to a position closer to the trailing edge.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Vehicles operating at high speeds, e.g., supersonic speeds in excess of Mach 1 (770 miles per hour (MPH)), and more particularly hypersonic speeds in excess of Mach 5 (3,800 MPH), exhibit reduced heat dissipation as a result of limited heat transmissivity of the neighboring medium. For example, plasma (which forms at high temperatures experienced during hypersonic speeds) can form around the vehicle and greatly limit heat transmissivity. As a result, the engine and vehicle systems overheat and/or are subjected to advanced degradation and wear. In accordance with one or more embodiments described herein, a coating is applied to the vehicle and/or engine surface, or a portion thereof, to shift the heat from a non-transmissive wavelength frequency to a transmissive frequency to allow the heat to penetrate through the air species and/or plasma and radiate away from the vehicle and/or engine. The use of such coating can create a variable effective energy emissivity contour resulting in a near isothermal surface, thereby increasing vehicle and/or engine reliability and extending service life.

The plasma state is a fourth state of material in addition to the liquid state, gaseous state, and solid state. Plasmas are generally described and classified in several ways, including by temperature, degree of ionization, density, and the like. Plasmas take a wide variety of forms including, for example, thermal plasmas approaching a state of local thermodynamic equilibrium, non-thermal plasmas, and ultracold plasmas. The degree of ionization of a plasma generally describes the proportion of charged particles to the total number of particles. As the proportion of charged particles changes, the propagation capability of the plasma necessarily changes.

Systems in thermodynamic equilibrium are often described on a blackbody radiation spectrum as defined by Planck's law. The radiation spectrum is generally characterized by temperature. However, plasma exhibits different radiational propagation as compared to the other three states of material. Radiation below a certain frequency, known as the plasma frequency, $\omega_p$, cannot propagate through plasma. Consequently, some radiation, i.e., radiation with frequencies above the plasma frequency, can propagate through the plasma while other radiation, i.e., radiation with frequencies below the plasma frequency, cannot propagate without being absorbed.

Black-body radiation is generally described as the thermal electromagnetic radiation within or surrounding a black body having an idealized opaque, non-reflective makeup. Thermal radiation by non-idealized bodies, i.e., non-black bodies, can be approximated as black-body radiation. At thermodynamic equilibrium, black-body radiation can be characterized as radiative equilibrium with emission and absorption occurring equally. Accordingly, at thermodynamic equilibrium there is an equal amount of emitted thermal radiation at every wavelength as compared to the absorbed thermal radiation. There are generally two attributes or characteristics which are responsible for non-black body radiative differences: radiative properties of the body such as emissivity, absorptivity, reflectivity, and transmissivity; and body geometry.

Plasma does not act like a black body at frequencies below the plasma frequencies, $\omega_p$. That is, plasma does not behave like an idealized opaque, non-reflective body. Instead, radiative wavelengths below the plasma frequency are precluded from propagating while radiative wavelengths above the plasma frequency can propagate through the plasma. This phenomenon leads to excessive radiation, i.e., heat, build up on objects travelling through the atmosphere at speeds sufficient to generate plasma layers, e.g., hypersonic speeds. At such high speeds, a plasma layer forms around the object, creating a barrier between the object and the surrounding atmosphere. For objects like aircraft and jet engines travelling at hypersonic speeds, this plasma barrier can create a heat lock, trapping heat and causing the aircraft or jet engine to overheat. Consequently, engine performance may diminish and benefits of hypersonic travel may become outweighed by practical concerns.

Figure 1:
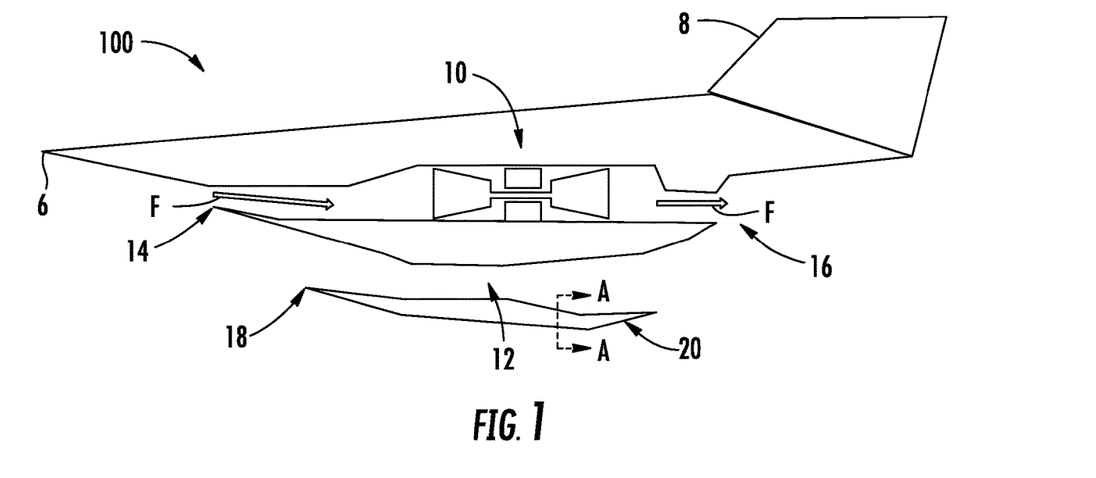
FIG. 1 is a simplified, schematic view of an aerospace vehicle in accordance with an exemplary embodiment of the present disclosure.

FIG. 1 illustrates an embodiment of an exemplary aerospace vehicle 100 for use at high speeds. As used herein, high speed refers to any range of speeds at which heat dissipation from the engine becomes limited as a result of low transmissivity relative to a neighboring medium surrounding the vehicle 100. For instance, a layer of plasma may form around the vehicle 100 at hypersonic speeds (e.g., in excess of 3,800 MPH) greatly reducing heat dissipation from the engine. By way of example, high speed may refer to speeds in excess of 1000 MPH, such as in excess of 1,500 MPH, such as in excess of 2,000 MPH, such as in excess of 3,000 MPH, such as in excess of 4,000 MPH, such as in excess of 5,000 MPH, such as in excess of 7,500 MPH, such as in excess of 10,000 MPH, such as up to 15,000 MPH.

The particular aerospace vehicle depicted in FIG. 1 is an aircraft 100, however, it should be understood that other vehicles may be applicable in accordance with other embodiments described herein. The aircraft 100 illustrated in FIG. 1 generally includes wings (not illustrated), a nose cone 6, and stabilizer 8. The aircraft 100 can operate at supersonic, or even hypersonic, vehicle using, e.g., a turbomachine 10 and a ramjet (or scramjet) 12. The turbomachine 10 includes a ram air entrance door 14 and an exhaust 16. Airflow F can pass through the turbomachine 10 and propel the aircraft 100 forward. The ramjet 12 includes a ramjet entrance door 18 and a ramjet exhaust 20. When active, the ramjet 12 can provide thrust to propel the aircraft 100 forward. In certain instances, the turbomachine 10 and ramjet 12 can operate concurrently. In other instances, the turbomachine 10 and ramjet 12 can operate independent of one another.

Figure 2:
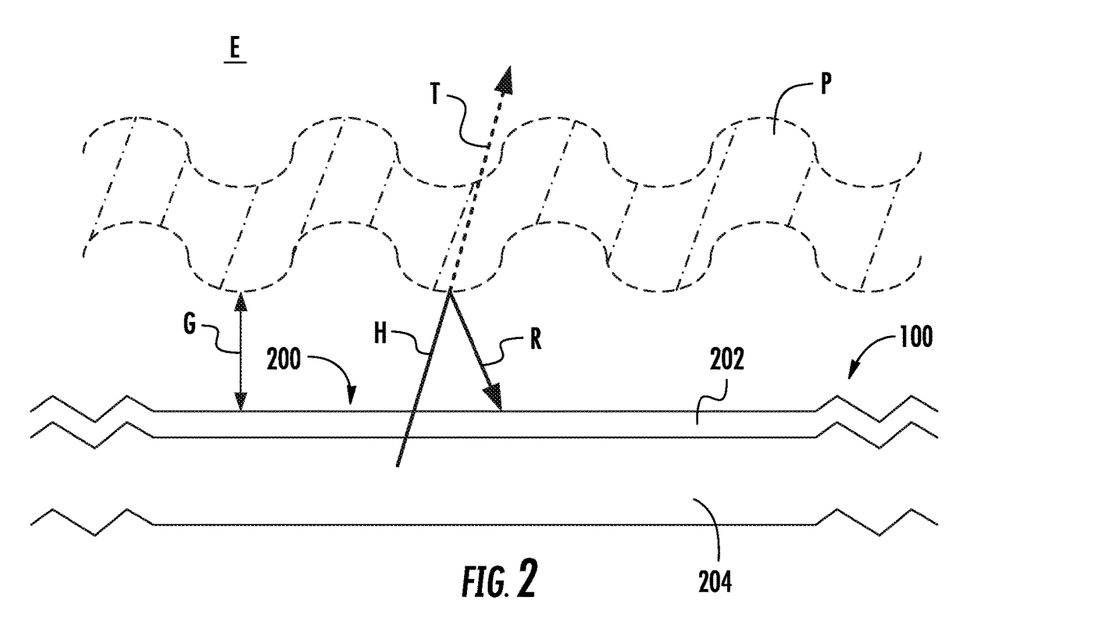
FIG. 2 is a schematic view of heat radiating from a surface of the engine as seen along Line A-A in FIG. 1, in accordance with an embodiment of the present disclosure.

FIG. 2 illustrates a cross sectional view of a surface of the vehicle 100 illustrated in FIG. 1 as seen along line A-A during high speed operations. The vehicle 100 generally includes a coating 202 disposed on at least a portion of a body 204 thereof. In the illustrated portion of the vehicle 100, the coating 202 is disposed on an external surface of the body 204. The coating 202 can further, or alternatively, be disposed on one or more internal surfaces of the body 202, another portion of the vehicle 100, or any combination thereof. In an embodiment, the coating 202 is disposed over at least a portion of the body 204 and configured to shift a frequency of at least one wavelength of heat generated by the body 204 (or nearby environment) from a first frequency to a second frequency having higher transmissivity relative to a neighboring medium surrounding the body 204 as compared to the first frequency. The first frequency can be below a plasma frequency ($\omega_p$) of the neighboring medium surrounding the engine body, whereas the second frequency can be above $\omega_p$. In a more particular embodiment, the at least one wavelength comprises a spectrum of wavelengths having first frequencies. The coating 202 is configured to shift at least a portion of the spectrum of wavelengths to one or more second frequencies having higher transmissivity relative to the neighboring medium surrounding the engine body as compared to the first frequencies.

As illustrated in FIG. 2, heat H radiates from the vehicle 100 towards a neighboring medium surrounding the body 204. The neighboring medium can generally include the area surrounding the vehicle 100. In the illustrated embodiment, the neighboring medium is formed in the air surrounding the vehicle 100. The neighboring medium is schematically depicted as including a plasma P however in other instances the neighboring medium can be a different material or differently-phased material other than plasma P. For instance, at lower speeds the neighboring medium can be air in a gaseous state. A gap G may exist between the plasma P and the vehicle 100. The gap G may be at least 0.1 mm, such as at least 0.5 mm, such as at least 1 mm, such as at least 5 mm, such as at least 10 mm. While the gap G is shown between the plasma P and the vehicle 100, in certain instances the gap G may be nonexistent or nominal. That is, the plasma P may be disposed immediately adjacent to the vehicle 100.

The plasma P can include a gas of ions and free electrons formed at high temperatures caused by combustion in the vehicle 100, a frictional interface formed between the vehicle 100 and a surrounding environment E, another source, or any combination thereof. In certain instances, the plasma P can act like an impermeable barrier with respect to electromagnetic radiation, e.g., heat H, radiated from and/or reflecting by the body 204. That is, the plasma P may prevent heat H from escaping an environment contained between the plasma P and the body 204, instead causing the heat to radiate back to the body 204 in the form of reflected heat R. The reflected heat R may become trapped between the vehicle 100 and plasma P and be reabsorbed by the vehicle 100, mitigating thermal cooling of the vehicle 100 and resulting in overheating and/or premature wear of one or more vehicle and/or engine components. It is thus desirable for the heat H to penetrate the plasma P as transmitted heat T to the surrounding environment E to permit vehicle cooling.

Figure 3:
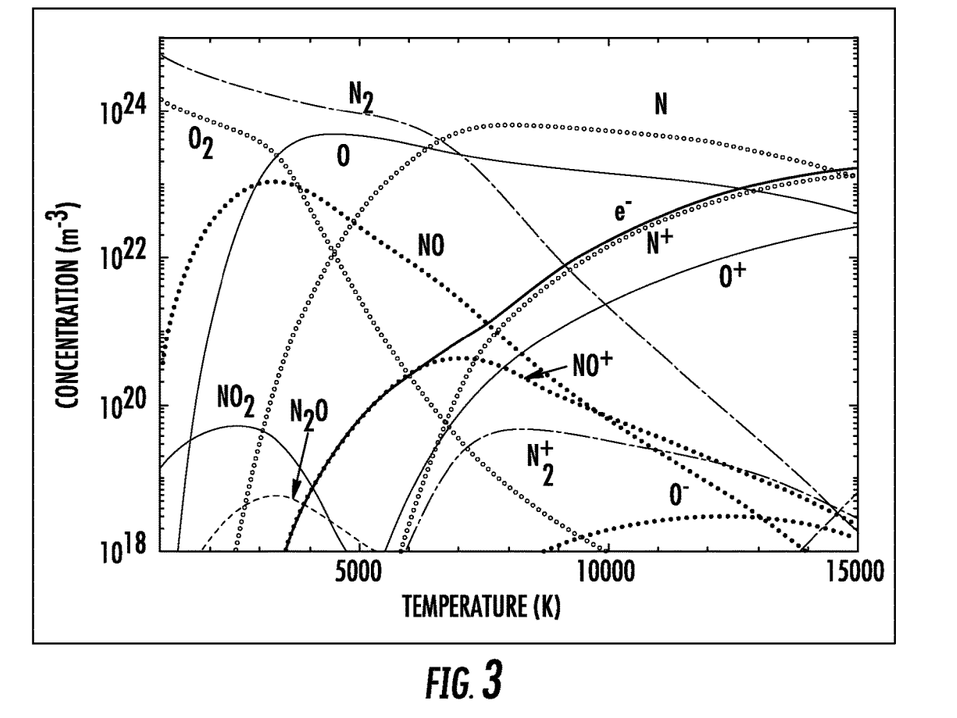
FIG. 3 is a chart illustrating concentrations of chemical species in dry air compositions corresponding with earth's atmosphere in accordance with an embodiment of the present disclosure.

The effect of thermal disequilibrium on plasma properties depends on chemical composition. That is, penetrating the plasma P with transmitted heat T is dependent upon the chemical composition of the surrounding environment E in which the plasma P is formed from. FIG. 3 is a chart illustrating concentrations of chemical species in dry air compositions corresponding with earth's atmosphere. The concentrations assume an approximate distribution of 80% nitrogen N2 and 20% oxygen $O_2$ in molar percentage at atmospheric temperature and pressure. As the temperature, illustrated in Kelvin (K), of the air composition increases, the molar percentage of components therein changes. For example, at approximately 5,000 K, the air composition includes $N_2$, O, $O_2$, N, NO, $O_2$, $NO^+$, and electrons (e) at various molar percentages. To the contrary, at approximately 10,000K, the air composition includes N, O, $N_2$, $N^+$, $O^+$, NO, $NO^+$, $N_{2+}$, $O^2$, $O^-$, and $e^-$ at different molar percentages as compared to the air composition at 5000 K. This clearly illustrates the high degree of differences existing between concentrations of chemical species and electrons at and out of thermal equilibrium for air plasma at atmospheric pressure.

Plasma oscillations occur as rapid oscillations of electron density as a result of instability in dielectric function of free electron gas. Plasmas define a plasma frequency ($\omega_p$) shown by equation (1) below, $$\omega p = \sqrt{\frac{\eta e^2}{\varepsilon_0 m}} \qquad \text{(Equation 1)}$$

Where $\omega_p$ is the plasma frequency is radians, $\eta$ is the number density (i.e., the number of particles per unit volume, $\varepsilon_0$ is the permittivity of free space, and m is the mass of the electron. The numeric expression for plasma frequency, $\omega_p$, is shown by equation (2) below, $$fp = \frac{\omega p}{2\pi} \qquad \text{(Equation 2)}$$

Figure 4:
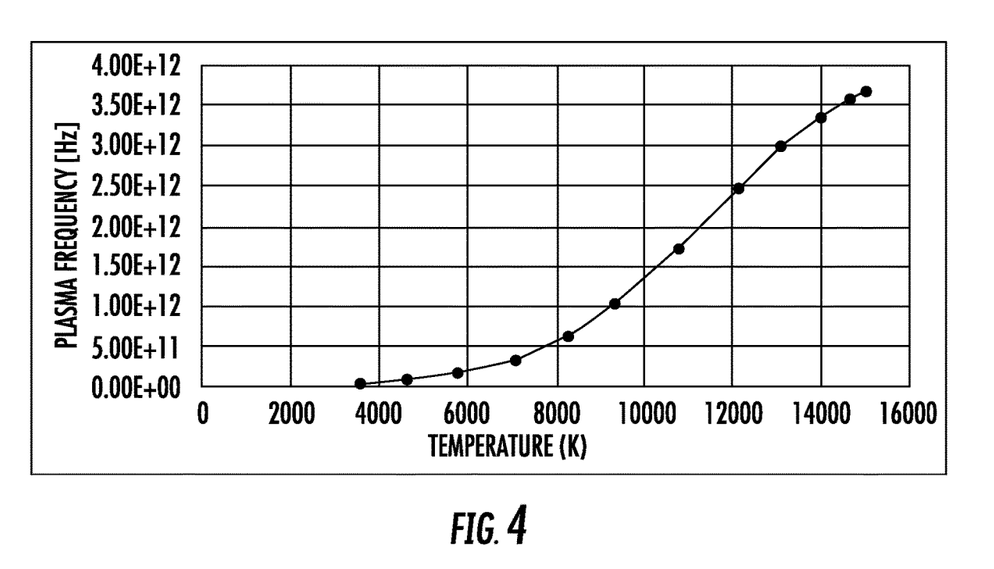
FIG. 4 is a chart illustrating the plasma frequency ($\omega_p$) of an air composition as a function of temperature, as measured in Kelvins in accordance with an embodiment of the present disclosure.

FIG. 4 illustrates the plasma frequency ($\omega_p$) of the air composition as a function of temperature, as measured in Kelvins. As illustrated, plasma formation in dry air composition begins to occur at approximately 3600 K, where the plasma frequency is approximately $3 \times 10 \times^{10}$ Hz. The plasma frequency increases as a function of temperature (K) with approximate plasma frequencies correlated to temperature shown below in Table 1.

TABLE 1 plasma frequency ($\omega_p$) and wavelength as a function of temperature

| Temperature (K) | Plasma Frequency (Hz) | Wavelength (pM) |
|---|---|---|
| 3580 | $3.8 \times 10^{10}$ | 26.3 |
| 4625 | $8.68 \times 10^{10}$ | 11.5 |
| 5770 | $1.68 \times 10^{11}$ | 5.95 |
| 7092 | $3.25 \times 10^{11}$ | 3.07 |
| 8276 | $6.29 \times 10^{11}$ | 1.59 |
| 9321 | $1.03 \times 10^{12}$ | $9.7 \times 10^{-1}$ |
| 10772 | $1.73 \times 10^{12}$ | $5.8 \times 10^{-1}$ |
| 12115 | $2.45 \times 10^{12}$ | $4.08 \times 10^{-1}$ |
| 13130 | $2.97 \times 10^{12}$ | $3.36 \times 10^{-1}$ |
| 14015 | $3.34 \times 10^{12}$ | $2.99 \times 10^{-1}$ |
| 14672 | $3.57 \times 10^{12}$ | $2.8 \times 10^{-1}$ |
| 15030 | $3.66 \times 10^{12}$ | $2.73 \times 10^{-1}$ |

As referenced in Table 1, the plasma frequency, $\omega_p$, increases as a function of temperature while the wavelength decreases as a function of temperature. Referring again to FIG. 4, transmissivity of heat through a plasma generally occurs only at frequencies above the plasma frequency, i.e., above the plotted line depicted in FIG. 4. Thus, for example, transmission of heat through plasma at a temperature of 10772 K generally requires the heat to have a frequency at or above $1.73 \times 10^{12}$ Hz, or a wavelength at or below $5.8 \times 10^{-1}$ picometers (pM). At frequencies below $1.73 \times 10^{12}$ Hz the heat will generally not pass through the plasma and will become trapped against the engine.

In accordance with an embodiment described herein, an outer surface 200 of the vehicle 100 is defined by the coating 202 applied along the body 204. In certain instances, the coating 202 can define a thickness, $T_C$, less than a thickness, $T_B$, of the body 204. By way of example, $T_C$ can be less than 0.99 $T_B$, such as less than 0.95 $T_B$, such as less than 0.75 $T_B$, such as less than 0.5 $T_B$, such as less than 0.25 $T_B$, such as less than 0.15 $T_B$, such as less than 0.1 $T_B$, such as less than 0.01 $T_B$. In other instances, $T_C$ can be greater than $T_B$.

The coating 202 can generally include materials configured to shift wavelengths of electromagnetic radiation, e.g., heat, from a first frequency, $HZ_1$, to a second frequency, $HZ_2$, different than the first frequency. The second frequency, $HZ_2$, may be higher than the first frequency, $HZ_1$. Thus, while the first frequency, $HZ_1$, of the heat may be below the plasma frequency, i.e., not transmittable through the plasma, the second frequency, $HZ_2$, of the heat may be above the plasma frequency, i.e., transmittable through the plasma. In such a manner, the coating 202 may shift the frequency of the heat radiating from the engine from a frequency that is non-transmittable through plasma to a frequency that is transmittable through the plasma. Thus, radiation of transmitted heat T through the plasma P as illustrated in FIG. 2 can occur.

In certain embodiments, the frequency shift of the heat radiation can occur through upconversion, whereby two or more photons of a lower frequency are absorbed into a material which becomes excited and is de-excited by combining the absorbed photons into a lesser number of photons, or even one photon, of higher frequency. This may be an anti-Stokes type emission.

Exemplary materials for the coating 202 include silicon nitride, silicon carbide, carbon, boron nitride, barium oxide, magnesia, silica, alumina, Pyroceram™ 9606, Rayceram™ 8, Nitroxyceram™, reaction-bonded silicon nitride (RBSN), hot-pressed silicon nitride (HPSN), Celsian™, one or more catalysts, and combinations thereof. Moreover, the coating 202 can include fillers, additives, nanoparticles, rare earth metals (e.g., yttrium, scandium, etc.) and the like.

The coating 202 can be applied to the body 204 using, e.g., thermal decomposition, coprecipitation, hydrothermal application, through sol-gel, combustion, microwave, microemulsion, and the like. Thermal decomposition may permit control of particle size and/or shape within the coating 202 while permitting short reaction time. Coprecipitation may include precipitation of two substances simultaneously. This process may reduce toxic by-products and requires inexpensive equipment and simple procedures. Hydrothermal application can rely on a solution-based method occurring in a water-based system at low reaction temperatures with high environmental safety. Sol-gel can be used for preparation of thin film coatings. The resulting coating can exhibit high strength and can easily be applied at scale. Combustion is a high-throughput method that is scalable, energy efficient, and low cost. These methods are not necessarily exclusive, and in certain instances application of the coating 202 can include two or more methods.

In an embodiment, the coating 202 can have a variable effective energy emissivity contour resulting in an approximately isothermal surface of the body 204. That is, by way of non-limiting example, placement of the coating can be performed along those portions of the vehicle body where temperatures are highest. This can allow those areas to radiate to space and cool toward the average vehicle body temperature.

Figure 5:
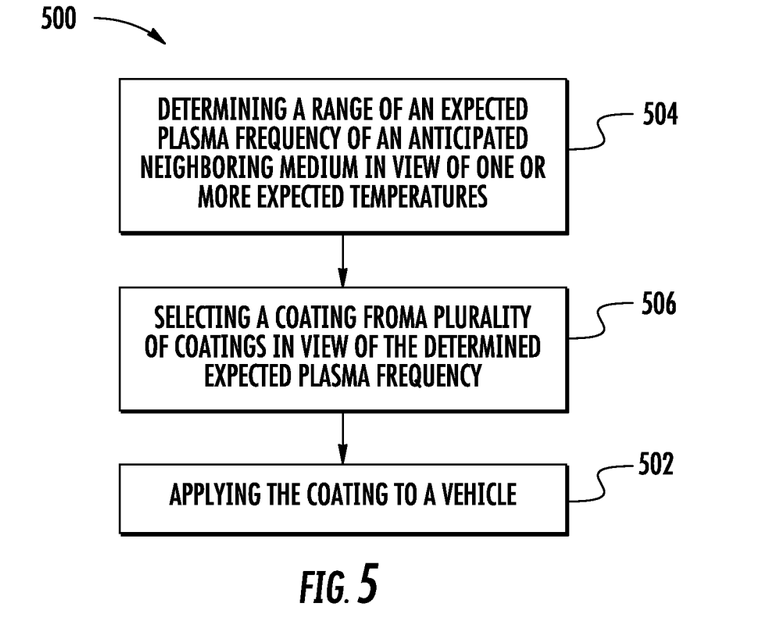
FIG. 5 is a flow chart of a method of dissipating heat in a hypersonic vehicle in accordance with an embodiment of the present disclosure.

FIG. 5 illustrates an exemplary method 500 of dissipating heat in a vehicle traveling at high speeds, e.g., hypersonic speeds. The method 500 includes a step 502 of applying a coating to the vehicle, e.g., an engine of the vehicle, or another portion thereof. The coating can be configured to shift a wavelength of heat from the engine to a frequency equal to or above an expected plasma frequency ($\omega_{pe}$) of a neighboring medium surrounding the engine during high-speed operation, e.g., during hypersonic travel. In an embodiment, step 502 can be performed through thermal decomposition, coprecipitation, hydrothermal application, through sol-gel, combustion, microwave, microemulsion, and the like.

In an embodiment, the method 500 can further include a step 504 of determining an anticipated range of $\omega_{pe}$ in view of one or more expected temperatures of the neighboring medium surrounding the engine at one or more operating speeds of the aircraft. The method 500 can also include a step 506 of selecting the coating from a plurality of coatings in view of the determined $\omega_{pe}$. The step 504 of determining the anticipated range of $\omega_{pe}$ and the step 506 of selecting the coating in view thereof may be performed prior to the step 502 of applying the coating to the vehicle, or a portion thereof.

Further aspects of the invention are provided by the subject matter of the following clauses:

Embodiment 1. An engine comprising: an engine body defining an inlet and an exhaust spaced apart by a combustion area, wherein the engine is configured to generate heat during operation; and a coating disposed over at least a portion of the engine body, the coating being configured to shift a frequency of at least one wavelength of the heat generated by the engine from a first frequency to a second frequency having higher transmissivity relative to a neighboring medium surrounding the engine body as compared to the first frequency.

Embodiment 2. The engine of any one or more of the embodiments, wherein the at least one wavelength of the heat comprises a spectrum of wavelengths having first frequencies, and wherein the coating is configured to shift at least a portion of the spectrum of wavelengths to one or more second frequencies having higher transmissivity relative to the neighboring medium surrounding the engine body as compared to the first frequencies.

Embodiment 3. The engine of any one or more of the embodiments, wherein the first frequency is below a plasma frequency ($\omega_p$) of the neighboring medium surrounding the engine body, and wherein the second frequency is above $\omega_p$.

Embodiment 4. The engine of any one or more of the embodiments, wherein the coating comprises silicon nitride, silicon carbide, carbon, boron nitride, barium oxide, magnesia, silica, alumina, Pyroceram™ 9606, Rayceram™ 8, Nitroxyceram™, reaction-bonded silicon nitride (RBSN), hot-pressed silicon nitride (HPSN), Celsian™, one or more catalysts, or any combination thereof Embodiment 5. The engine of any one or more of the embodiments, wherein the neighboring medium comprises a plasma, and wherein the heat generated by the engine is at least 4000 Kelvin (K).

Embodiment 6. The engine of any one or more of the embodiments, wherein the coating has a variable effective energy emissivity contour resulting in an approximately isothermal surface of the engine body.

Embodiment 7. The engine of any one or more of the embodiments, wherein the engine is configured to operate at hypersonic speeds.

Embodiment 8. A supersonic vehicle comprising: a vehicle body; an engine that generates heat during operation; and a coating disposed on at least a portion of the engine, the vehicle body, or both, the coating being configured to shift a wavelength of the heat to a frequency equal to or above a plasma frequency ($\omega_p$) of a neighboring medium surrounding the engine during supersonic operation.

Embodiment 9. The supersonic vehicle of any one or more of the embodiments, wherein the coating comprises silicon nitride, silicon carbide, carbon, boron nitride, barium oxide, magnesia, silica, alumina, alumina, Pyroceram™ 9606, Rayceram™ 8, Nitroxyceram™, reaction-bonded silicon nitride (RBSN), hot-pressed silicon nitride (HPSN), Celsian™, one or more catalysts, or any combination thereof.

Embodiment 10. The supersonic vehicle of any one or more of the embodiments, wherein the supersonic vehicle is configured to travel at hypersonic speeds.

Embodiment 11. The supersonic vehicle of any one or more of the embodiments, wherein the coating is configured to reflect or dissipate the heat in a direction away from the engine, the vehicle body, or both.

Embodiment 12. The supersonic vehicle of any one or more of the embodiments, wherein the direction of emission is oriented generally away from earth when the supersonic vehicle is operating at supersonic speeds.

Embodiment 13. The supersonic vehicle of any one or more of the embodiments, wherein the heat is at least 4000 K.

Embodiment 14. The supersonic vehicle of any one or more of the embodiments, wherein the heat is generated by the combustion area, a frictional interface between the engine and the neighboring medium, or both.

Embodiment 15. The supersonic vehicle of any one or more of the embodiments, wherein the coating has a variable effective energy emissivity contour resulting in an approximately isothermal surface of the engine.

Embodiment 16. The engine of any one or more of the embodiments, wherein the coating has a variable effective energy emissivity contour resulting in an approximately isothermal surface of the engine.

Embodiment 17. A method of dissipating heat from a hypersonic vehicle, the method comprising: applying a coating to at least a portion of an engine of the hypersonic vehicle, a vehicle body of the hypersonic vehicle, or both, the coating being configured to shift a wavelength of heat emitted by the engine to a frequency equal to or above an expected plasma frequency ($\omega_{pe}$) of a neighboring medium surrounding the vehicle during hypersonic operation.

Embodiment 18. The method of any one or more of the embodiments, further comprising: determining an anticipated range or value of expected plasma frequencies $\omega_{pe}$ in view of one or more expected temperatures of the neighboring medium surrounding the engine at one or more operating speeds; and selecting the coating from a plurality of coatings in view of the determined $\omega_{pe}$.

Embodiment 19. The method of any one or more of the embodiments, wherein the coating is selected from a plurality of coatings comprising silicon nitride, silicon carbide, carbon, boron nitride, barium oxide, magnesia, silica, alumina, alumina, Pyroceram™ 9606, Rayceram™ 8, Nitroxyceram™, reaction-bonded silicon nitride (RBSN), hot-pressed silicon nitride (HPSN), Celsian™, one or more catalysts, or any combination thereof.

Embodiment 20. The method of any one or more of the embodiments, wherein applying the coating is performed such that the coating dissipates heat in a direction generally towards space.

What is claimed is:

1. An aerospace vehicle comprising:
a body configured to generate heat during operation;
an engine configured to generate heat during operation;
a coating disposed over at least a portion of the body and the engine, the coating being configured to shift a frequency of at least one wavelength of the heat generated by the body and the engine from a first frequency to a second frequency having higher transmissivity relative to a neighboring medium surrounding the body and the engine as compared to the first frequency, wherein the coating is an applied coating to the body and the engine of the aerospace vehicle, and wherein the neighboring medium is air surrounding the aerospace vehicle during high speed flight,
wherein the coating is applied to the body and the engine using thermal decomposition, coprecipitation, hydrothermal application, sol-gel, combustion, microwave, microemulsion, or a combination thereof.

2. The aerospace vehicle of claim 1, wherein the at least one wavelength of the heat comprises a spectrum of wavelengths having first frequencies, and wherein the coating is configured to shift at least a portion of the spectrum of wavelengths to one or more second frequencies having higher transmissivity relative to the neighboring medium surrounding the body and the engine as compared to the first frequencies.

3. The aerospace vehicle of claim 1, wherein the first frequency is below a plasma frequency ($\omega_p$) of the neighboring medium surrounding the body and the engine, and wherein the second frequency is above $\omega_p$.

4. The aerospace vehicle of claim 1, wherein the coating comprises silicon nitride, silicon carbide, carbon, boron nitride, barium oxide, magnesia, silica, alumina, reaction-bonded silicon nitride (RBSN), hot-pressed silicon nitride (HPSN), one or more catalysts, or any combination thereof.

5. The aerospace vehicle of claim 1, wherein the neighboring medium comprises a plasma, and wherein the body and the engine are is configured to operate at a temperature of at least 4000 Kelvin (K).

6. The aerospace vehicle of claim 1, wherein the coating has a variable effective energy emissivity contour.

7. The aerospace vehicle of claim 1, wherein the body and the engine are configured to operate at hypersonic speeds.

8. A supersonic vehicle comprising:
a vehicle body;
an engine that generates heat during operation; and
a coating disposed on at least a portion of the engine and the vehicle body, the coating being configured to shift a wavelength of the heat generated by the engine to a frequency equal to or above a plasma frequency ($\omega p$) of a neighboring medium surrounding the engine during supersonic operation, wherein the coating is an applied coating to the body and the engine of the supersonic vehicle, and wherein the neighboring medium is air surrounding the supersonic vehicle during high speed flight,
wherein the coating is applied to the body and the engine using thermal decomposition, coprecipitation, hydrothermal application, sol-gel, combustion, microwave, microemulsion, or a combination thereof.

9. The supersonic vehicle of claim 8, wherein the coating comprises silicon nitride, silicon carbide, carbon, boron nitride, barium oxide, magnesia, silica, alumina, reaction-bonded silicon nitride (RBSN), hot-pressed silicon nitride (HPSN), one or more catalysts, or any combination thereof.

10. The supersonic vehicle of claim 8, wherein the supersonic vehicle is configured to travel at hypersonic speeds.

11. The supersonic vehicle of claim 8, wherein the coating is configured to reflect or dissipate the heat in a direction away from the engine and the vehicle body.

12. The supersonic vehicle of claim 11, wherein the direction of emission is oriented away from earth when the supersonic vehicle is operating at supersonic speeds.

13. The supersonic vehicle of claim 8, wherein the body and the engine are configured to operate at a temperature of at least 4000 K.

14. The supersonic vehicle of claim 8, wherein the coating has a variable effective energy emissivity contour.

15. The aerospace vehicle of claim 1, wherein the coating defines a thickness, $T_C$, less than a thickness, $T_B$, of the body.

16. The aerospace vehicle of claim 15, wherein the thickness, $T_C$, is less than 0.75 times the thickness, $T_B$.

17. The supersonic vehicle of claim 8, wherein the coating defines a thickness, $T_C$, less than a thickness, $T_B$, of the body.

18. The supersonic vehicle of claim 17, wherein the thickness, $T_C$, is less than 0.75 times the thickness, $T_B$.

\* \* \* \* \*